(12) United States Patent
Gibson et al.

(10) Patent No.: US 6,975,575 B2
(45) Date of Patent: Dec. 13, 2005

(54) DATA STORAGE MEDIA AND METHODS UTILIZING A LAYER ADJACENT THE STORAGE LAYER

(75) Inventors: Gary A. Gibson, Palo Alto, CA (US); Alison Chaiken, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 677 days.

(21) Appl. No.: 10/000,404

(22) Filed: Oct. 31, 2001

(65) Prior Publication Data

US 2003/0081527 A1    May 1, 2003

(51) Int. Cl.$^7$ .............................. G11B 7/00; G11B 9/00
(52) U.S. Cl. .................... 369/100; 369/126; 369/275.2
(58) Field of Search ................................ 369/126, 100, 369/101; 365/118, 128, 217, 218, 237, 151

(56) References Cited

U.S. PATENT DOCUMENTS

| | | | |
|---|---|---|---|
| 4,213,192 A | | 7/1980 | Christensen, Sr. |
| 5,557,596 A | | 9/1996 | Gibson et al. |
| 6,275,410 B1 | * | 8/2001 | Morford ..................... 369/101 |
| 6,473,388 B1 | * | 10/2002 | Gibson ....................... 369/126 |
| 6,735,163 B2 | * | 5/2004 | Marshall ..................... 369/126 |

FOREIGN PATENT DOCUMENTS

| | | |
|---|---|---|
| EP | 1187123 | 8/2000 |
| EP | 1239469 | 3/2002 |
| EP | 1211680 | 6/2002 |
| WO | WO9963536 | 12/1999 |

* cited by examiner

*Primary Examiner*—Thang V. Tran (57) ABSTRACT

A data storage unit includes a data storage layer with multiple storage areas having a storage medium disposed thereon that changes between a plurality of states for writing and reading information. An array of beam emitters, such as laser light probes or near-field light sources, are spaced in close proximity to the data storage layer. A layer (LASL) adjacent to the storage layer generates carriers (electrons, holes or photons) in response to the light beams. Data is read by directing a light beam onto the data storage layer. The storage medium on the data storage layer affects the generation of carriers or alters the transport of carriers after generation by the LASL, depending upon the state of the storage medium. The carriers are detected in a detection region in carrier communication with the LASL to detect the presence of data. The detection region may comprise any type of region for detecting carriers, including a semiconductor diode junction and a photoconductive region. The presence of data in the storage areas is determined by the number of carriers transported across the semiconductor junction or the number of carriers transported in the photoconductive regions between electrodes.

26 Claims, 4 Drawing Sheets

DATA STORAGE MEDIA AND METHODS UTILIZING A LAYER ADJACENT THE STORAGE LAYER

BACKGROUND OF THE INVENTION

1. Field of Invention

The present invention pertains to the field of information storage units. More particularly, this invention relates to an information storage unit using a layer adjacent the storage layer to affect data detection.

2. Background

Electronic devices, such as palm computers, digital cameras and cellular telephones, are becoming more compact and miniature, even as they incorporate more sophisticated data processing and storage circuitry. Moreover, types of digital communication other than text are becoming much more common, such as video, audio and graphics, requiring massive amounts of data to convey the complex information inherent therein. These developments have created an enormous demand for new storage technologies that are capable of handling more complex data at a lower cost and in a much more compact package.

One response to this demand has been the development of ultra-high density storage devices, such as the one described in U.S. Pat. No. 5,557,596 granted to Gibson et al. on Sep. 17, 1996. This system provides for a plurality of electron emitters generating beams of electrons to information storage media areas on a movable platform to store and retrieve information. A micro mover, based on micro electro mechanical systems (MEMS) technology moves the platform relative to the electron emitters to enable parallel communications with selected storage media areas on the platform. In the Gibson et al patent, an electron beam impacts storage media areas at different intensities, selectively altering some aspects of the storage material, such as changing the state of the storage material between amorphous and crystalline phases or between different crystalline phases that affect the response of the storage medium to a readback stimulus, such as the response of a diode storage medium to a readback electron beam.

There is a continued need for increased miniaturization and expanded ability to handle greater quantities of more complex data at a faster speed and in even more compact areas. The industry is moving towards the storage of data in the range of tens to hundreds of nanometers.

Several challenges arise in attempting to store data at this level. The processes of information storage and retrieval become increasingly difficult tasks, and writing and reading data with electron beams presents several limitations. It is possible to use low energy electrons in this technique to avoid problems with dielectric breakdown, field emission from undesirable locations, and the need for relatively large and expensive power supplies. However, data detection becomes difficult because low energy electrons have very short penetration depths, making this approach highly susceptible to the surface conditions of the medium. Moreover, only very thin layers may be present on the top of the storage media, making difficult the use of a protective layer or a conducting electrode on top of the storage layer. In addition, the stability and cyclability of a storage device using electron-readback may be limited by the mechanical and thermal properties of the free surface of the storage medium. Only very thin protective cladding layers can be used with a low-energy electron-beam addressing scheme, as thicker layers would prevent access by low energy electrons.

In some miniature storage devices, such as CD-RW and DVD-RW drives, data is written and/or detected using directed light beams, such as lasers, to reversibly change the optical reflectivity of a storage medium. As data storage densities and miniaturization increase, the diffraction-limited spot size of the lasers sets a lower bound to the size of bits to be written. However, this diffraction limit can be circumvented using near-field light sources that provide evanescent light emitted through a small aperture. In such systems, data may be detected by impacting the storage area with a photon beam and then detecting the flow of electrons, holes or photons (hereinafter called "carriers") emitted from the data storage area. An example of using a directed light beam system for reading data in a high-density storage device by detecting carrier flow is shown in our co-pending patent application entitled "Data Storage Media Utilizing Directed Light Beam and Near-Field Optical Sources" (U.S. Ser. No. 09/865,940 filed on May 25, 2001).

The storage of data at substantially increased densities gives rise to problems in the task of reading the data. High-density storage devices make sensing data increasingly difficult because of interference from neighboring non-selected memory cells and because the flows of electrons, photons or holes generated from the sensing process are so small that detection becomes extremely difficult and errors in data detection increase.

Accordingly, to read miniature data cells in high-density memory storage, it is desirable to develop techniques capable of producing greater amounts of carrier flows and more effective methods of converting energy from light or electrons to detectible carriers. Memory structure and methods are needed to store and read high-density data so that detection of data is more readily obtained.

SUMMARY OF THE INVENTION

The present invention provides high-density memory storage utilizing directed light beams to read data in the memory storage by generating a flow of carriers, and that includes enhancing structure and methods for affecting the carrier transport to improve the sensing and detection of data while minimizing error. "Carriers" as used herein refers to electrons, holes, and/or photons that are generated by the impact of photons on semiconductor materials in one of the layers described herein. "Carrier transport" as used herein refers to the movement or flow of carriers through a medium. The enhancing structure is a layer (LASL) adjacent the storage layer that contributes to or affects the carrier transport at a detection point to improve detection and lower the possibility of error.

In one preferred embodiment of the invention, a data storage unit comprises a data storage layer having a plurality of data storage areas for reading data thereon during the read phase. An array of beam emitters are disposed in close proximity to the data storage layer to selectively direct a beam to a selected data storage area to read data stored therein. A medium is disposed on the data storage areas that can be changed between a plurality of states by a first light or electron beam during a write cycle. The plurality of states exhibit substantial differences in their responses to light beams during a read phase. This difference may relate to (1) the nature of light absorption and/or light reflection of the medium in its different states, (2) the capability of the states for carrier generation or recombination and/or (3) the impact of the states on local electric fields that, in turn, influence the generation and recombination of carriers.

A layer (LASL) adjacent to the data storage layer is provided for generating or affecting the flow (transport) of carriers during the read phase. In addition the LASL may improve the electrical, optical or thermal properties of the device stack, either through its own electrical, optical or thermal properties, or by improving the properties of the storage layer. The carrier generation and transport in the LASL may be the result of direct impact of beams from the beam emitters, carrier transport from the data storage layer, and/or an electric field impressed on the LASL or the storage layer. A detection region in communication with the data storage areas or with the LASL is provided for determining the activity of the electron-hole pairs during the read phase, the activity of the electron-hole pairs being relative to the state of each storage areas. A detector senses the electron-hole pair activity in the detection region to determine the state of each storage area.

In another preferred embodiment, a data storage unit comprises a data storage layer having a data storage area with data stored thereon. A light beam emitter is disposed to selectively direct a light beam toward the data storage layer to read said data from the data storage area. The storage layer is partially transparent to the beam of light. The storage area is a filter for the light passing through the storage area, the amount of filtered light being dependent on the state of the storage area. A layer (LASL) is disposed adjacent to the data storage layer in which carriers are generated in response to the amount of light reaching the LASL. A detection region is in light communication with the LASL for measuring the carrier transport in the detection region to determine the state of the storage area.

Another embodiment of the present invention comprises a method for reading data in a data storage unit including a data storage layer having a data storage area with data thereon. A layer (LASL) is disposed adjacent to the storage layer. A light beam from a light beam emitter directs an optical beam toward the LASL and the data storage layer. The light beam passing through the data storage layer is filtered in a variable amount, depending on the state of the data storage area in the data storage layer. A carrier flow is generated in the LASL corresponding to the amount of light reaching the LASL from the beam emitter. The carriers transported in a detection region in carrier communication with the LASL are measured to determine the state of the data storage area.

The carriers provide an activity or response, such as a change in current, voltage or light radiation, that is also dependent on the states of the storage area medium. The relative activity of the carriers is sensed by a detector during the read phase to determine the presence or absence of data bits in the storage areas.

Another embodiment relates to a data storage unit, having a data storage layer with a data storage area having at least two states for storing data stored thereon. A layer (LASL) is disposed adjacent to the data storage in which carriers are generated for determining the state of the storage area.

In another preferred embodiment, a data storage unit has a data storage layer with a data storage area for storing data stored thereon. A medium is provided in the data storage area that is capable of changing between at least two states. The medium is conducive to providing a substantial contrast between the states in light filtering characteristics.

Other aspects and advantages of the present invention will become apparent from the following detailed description, which in conjunction with the accompanying drawings illustrates by way of example the principles of the present invention.

DETAILED DESCRIPTION OF THE INVENTION

Background

The present invention preferably uses a directed light beam to read the data in the storage area. The storage layer utilizes a medium in the storage areas of the storage layer that is susceptible to changing states in response to directed light beams. As used herein it is understood that the term "light beams" includes directed light beams such as lasers and evanescent fields generated by near-field optic systems.

One type of storage medium is a material that changes between amorphous and crystalline states or to various phases within such states in response to light or electron beams, depending on the amount, intensity and duration of the beam. Light beams are also utilized, usually at a lower intensity, to read the data in the affected area by impinging or stimulating the area with a directed beam. The storage areas vary in their response to the light beam, depending on the state of each storage area.

A more detailed discussion of this state change of data storage areas in response to electron beams is given in U.S. Pat. No. 5,557,596 (Gibson et al.). As used herein, the term "states" is meant to include different crystalline phases and the amorphous state, as well as variations in chemical composition, or morphology, or changes in the density, location or nature of trapped charges, or the density and type of defects that affect the relevant electrical properties.

The LASL preferably has a characteristic of responding to a directed read beam by generating some type of carrier flow or transport that can be detected to determine the state of the storage area being sensed.

As discussed below, light beams are directed to a LASL, either indirectly through the storage layer if the LASL is beneath the storage layer, or directly if the LASL is on top of the storage layer. In the first case, the light is partially filtered by storage areas in a storage layer. As used herein, "filtered" means absorbed, reflected and/or otherwise affected or changed. Preferably, the plurality of the states of the medium in the storage areas exhibit substantial differences in the amount of light absorbed or reflected. Electron-hole carrier activity is generated in the LASL in proportion to the amount of light reaching the LASL from a storage area in at least one of the states when impacted by a directed light beam. This electron-hole carrier pair activity can be modulated by the number of carriers that are initially generated by the light beam, and/or by the fraction of generated carriers that flow across a diode junction (diode embodiment), that recombine while emitting radiation (photoluminescent embodiment), or that change the effective conductivity of a photoconductive LASL photoconductivity embodiment).

If the LASL is disposed above the storage layer, it is preferably a photoluminescent layer acting as a wavelength transformer. The light emitted by the LASL is partially reflected or absorbed in the storage areas of the storage layer in accordance with the state of the storage areas. The transmitted light then impacts a photoconductor to cause carrier activity that is detected to determine the states of the storage areas. Alternatively, the LASL above the storage layer may function as a protective overlayer. These embodiments will be discussed in greater detail below.

Thus, the nature of the data stored in each data storage area (represented by its state) is reflected in a substantial difference in the number and the activity of carriers that are generated by a light beam during the read phase. Typically the read light beam is directed at a lower level of intensity than the write light beam, so as to not cause unwanted writing in the storage areas. For directed light beams, suitable materials for providing contrast between different states of the materials with regard to the activity of electron-hole carrier pairs for the three media types described herein would include various chalcogen-based compounds.

Figure 1:
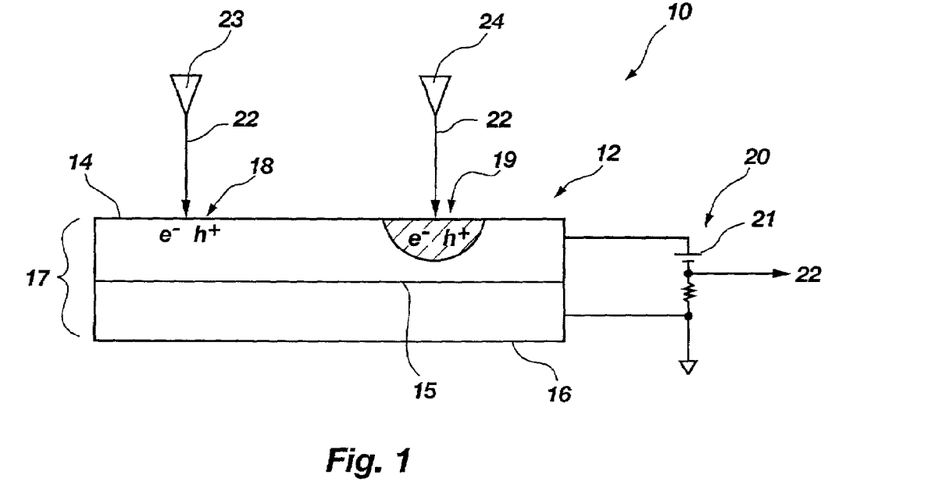
FIG. 1 is a schematic cross-section view of a data storage device utilizing a semiconductor diode junction for detecting the state of a sensed data storage area.

With reference to FIG. 1, background disclosure is provided for understanding the present invention. A data storage system 10 includes a memory storage unit 12 having at least two layers 14, 16. Layer 14 is a data storage layer having multiple data storage areas 18, 19. Layers 14 and 16 form a diode 17 having a junction 15 across which electron and/or hole carriers flow. The diode can be any type that provides a built-in field for separating charge carriers, such as a p-n junction, an n-n' or p-p' homotype heterojunction or Schottky barrier device, depending on the materials used. The storage areas are written and read by using beams from beam emitters 23, such as light emitting devices or a near-field optic system. A detection circuit 20 is connected across junction 15 showing one way to sense the carrier transport indicating the data in the storage areas.

In one background example, a data bit is written by locally altering the state at area 19 of the storage layer 14 with the use of a directed light beam 22 from light emitting unit 24. Another storage area 18 may be impacted by a similar light emitting unit 23 in another read cycle. As shown storage area 18 is in one state and storage area 19 has been changed to another state. The different states of the storage areas 18 and 19 must provide a contrast in bit detection during the read function.

The storage layer 14 may comprise a phase-change material similar to those typically used in optical recording. These materials can be reversibly changed from crystalline to amorphous by applying heat at a pre-determined temperature profile over a pre-selected time period. The state may be changed from crystalline to amorphous by heating the area with a high intensity light beam, sufficient to melt the phase-change material, and then quickly decreasing the intensity of the beam to quench the area. Quenching a phase-change material causes it to cool rapidly into an amorphous state without time to anneal. The state of the storage area may be changed from amorphous to crystalline by using a light beam to heat the phase-change material just enough to anneal it. Alternatively, the materials may be changed from one crystalline state to another crystalline state using different temperatures for different time periods. The near-field evanescent light field can be regulated to apply the temperature-time profile and change the phase. Other sources of energy, such as a resistive heater or applied electric or magnetic field may be used to bias a large area of the storage layer 14 to aid the light beams 22 in locally affecting a phase change in the storage areas 18 and 19.

During the read function, the light emitters 22 preferably emit a lower level energy field than during the write cycle, but still of sufficient energy to locally excite charge carriers in the storage areas 18, 19. If carriers are excited in the storage layer 14, the number of carriers created (the "generation efficiency") will depend on the state of the storage areas 18, 19 where the light beams 22 are incident. A factor that affects generation efficiency is the band structure of the storage layer. Some fraction of the generated carriers of one sign (electrons or holes) will be swept across the diode interface 47 (the "collection efficiency") under the influence of a built-in field. The collection efficiency is dependent upon, among other things, the recombination rate and mobility in and around the area on which the read photons are incident and the effect of the built-in fields. An additional field may be applied across detection circuit 20 by a voltage source 21. The current that results from carriers passing across the diode interface 15 can be monitored by a detection signal 22 taken across the interface junction 15 to determine the state of data storage areas 45. Alternatively, the diode can be operated "open circuit" without current flowing across the junction and the open-circuit voltage developed across the diode can be monitored.

Thus, variations in the current generated across the diode 17 by the read photons can depend on both the local generation efficiency and the local collection efficiency. Both of these factors are influenced by the state of the region upon which the photons are incident. The phase-change material of storage layer 14 can be comprised of a number of phase change materials with the appropriate electrical properties (bandgap, mobility, carrier lifetime, carrier density, etc.) including a number of chalcogenide-based phase-change materials.

Layer Adjacent the Storage Layer

Figure 2:
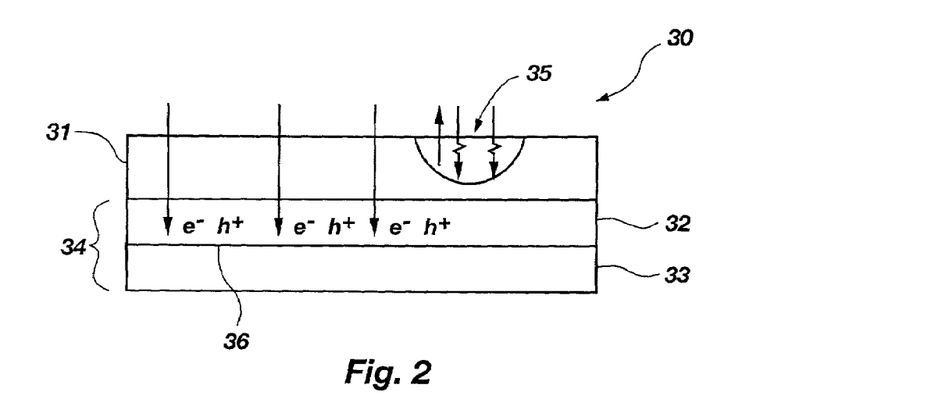
FIG. 2 is a schematic cross-section view illustrating the LASL principle of the present invention with an adjacent layer structure below the storage layer.
Figure 3:
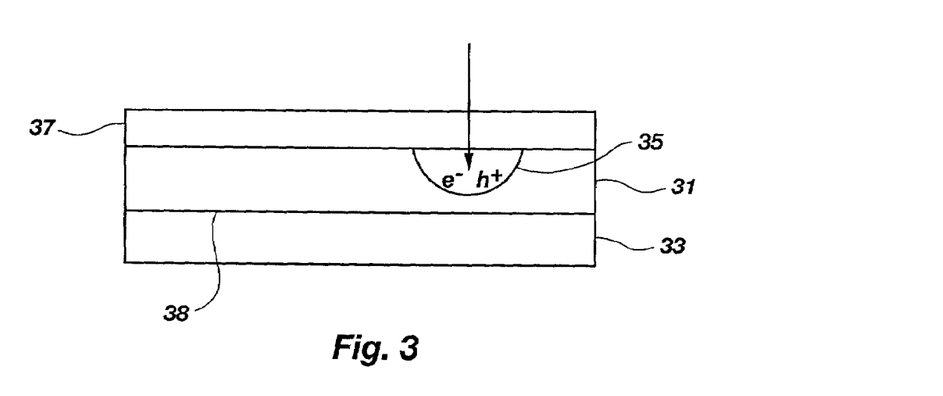
FIG. 3 is a schematic cross-section view illustrating the LASL principle of the present invention with an adjacent layer structure above the storage layer.

FIGS. 2 and 3 illustrate the principle of the LASL in two different implementations within the environment shown in FIG. 1. An additional layer (LASL) is provided adjacent to the storage layer for the purpose of generating carriers and/or affecting the location and efficiency of generation of carriers by the light beams during the read mode and/or the flow of these carriers after generation. This concept may be applied in a variety of different devices for sensing carrier transport, including but not limited to a semiconductor diode, a photoconductive region and a photo-luminescent region, as further described herein.

A diode configuration 30 is shown in FIG. 2, in which an adjacent layer 32 is disposed directly below a storage layer 31. In this position the adjacent layer 32 forms a diode having a junction 36 across which the carrier transport is detected. In this arrangement, the storage layer 31 and the LASL 32 may interact in several ways.

In one application, the LASL 32 is used as the primary generator of carriers and the storage layer acts as a variable absorber and/or reflector of the beam. In this approach a different amount of light will reach the LASL 32 depending on the state of each portion of the storage layer 31. In most cases, for those portions that are crystalline more photons will penetrate to the LASL than for the amorphous portions. Thus, the generation of carriers in the LASL 32 beneath storage area 35 will vary, depending on the presence or absence of a bit in the storage area 35.

One advantage of this approach is that the functions of data storage and data detection are separated, so that the best type of materials for each function can be selected. Thus, the material used for the storage layer 31 will be selected based primarily on its capability to change states in the desired manner to store data, and the contrast between the states in the degree to which light is absorbed or reflected. The storage layer 31 does not need to have the electrical properties necessary for forming a good diode junction with layer 33. In contrast, the material used for the LASL 32 will be selected based primarily on its capability to generate carriers and to form a junction with layer 33 with a high collection efficiency for carriers generated in the LASL 32.

In another application for the structure shown in FIG. 2, the storage layer 31 is arranged or selected so that it has an effect on the carriers collected at the diode interface between LASL 32 and diode layer 33. (32/33 interface). In this arrangement, carriers can be generated in either layer 31 or layer 32 and the number of carriers reaching the 32/33 interface detection area is primarily influenced by the type and degree of interactions between the storage layer 31 and the LASL 32.

More specifically, the state of the storage layer 31 may affect the carriers collected at the 32/33 diode interface by a contrast in (1) the number of carriers generated by the storage layer 31 that make it to the 32/33 diode interface, (2) the recombination rate of electron-hole pairs at the 31/32 storage layer/LASL interface, and/or (3) the effect of the storage layer 31 on the fields (built-in and applied) in the storage layer 31 and LASL 32. The 31/32 interface does not need to have low leakage and may form a rectifying junction or an ohmic contact. In either case, it should not impede carriers and should have a low recombination rate for the types of carriers that are detected at the 32/33 diode interface.

There are several ways that the LASL 32 can help in this arrangement. One way is by forming a better junction or interface with the bottom layer 33 (32/33 diode interface) than would be formed by storage layer 31. The 32/33 diode interface is improved in that there is more efficient collection of the generated carriers and/or less leakage current in the absence of the read beam. The collection efficiency is improved by the 32/33 diode interface being formed such that there are no problematic band-offsets or unwanted interface states that cause recombination or charge trapping, all of which can impede carrier collection.

In some cases, it may be difficult to find a phase-change material for the storage layer 31 that forms a good junction with another layer 33 and does not have collection efficiency or leakage problems. Thus, in the embodiments where the LASL 32 does not form a rectifying junction with the storage layer 31, the LASL 32 can help by separating out the functions of storage, which requires material properties that allow phase-changing, from the material properties required for the formation of low-leakage diode junctions with high carrier collection efficiency. Adding the LASL 32 divides these material requirements between two layers so that each layer can be selected for optimum performance of the required functions.

On the other hand, the new interface between the storage layer 31 and the LASL 32 and the extra transport required across the LASL 32 must also be considered. The carriers generated in the storage layer 31 must make it across the LASL 32 to be collected by the 32/33 interface or junction. This means that either the diffusion length for the carriers in the LASL 32 must be long compared to the LASL thickness, or a strong field must be applied such that the schubweg of the carriers is long compared to the LASL thickness.

The LASL 32 may also be used to generate an amplification or multiplication of carriers. In that case a field is applied across the LASL 32 that is strong enough to cause impact ionization and an avalanche effect in the LASL. Note, however, that this may be difficult to do without applying a field to the other layers that will cause distortion or other undesirable effects.

In a third application, carriers can be generated in either the LASL 32 or storage layer 31. The phase state of the storage area 35 would affect the electric field of the LASL 32 and thereby influence the number of carriers crossing the LASL 32/layer 33 diode interface to produce a signal. Any of the arrangements indicated above, or a combination of these effects would facilitate detection of the carriers in the detection area and should substantially reduce the possibility of bit-detection error.

As shown in FIG. 3, an adjacent layer 37 may be disposed above the storage layer 31. In this embodiment, a directed beam first impacts the adjacent layer 37 before reaching the storage area 35 in storage layer 31. The storage layer 31 forms part of the diode structure with layer 33, so that carrier flow across junction 38 between layers 31 and 33 indicates the state of area 35. The LASL may be made of a photoluminescent material that acts as a wavelength transformer, changing the wavelength from the directed light beams to a wavelength that is more compatible for the storage layer to generate carrier activity. Alternatively, this structural arrangement may be applied for the LASL 37 to be used as a protective layer, an anti-reflective coating or a conductive layer, in the event that a field is applied. For better understanding of the invention, a preferred embodiment is shown using a diode junction similar to that shown above and described below for establishing carrier flow for detecting the state of a storage area. Two alternate embodiments are described, also using a LASL arrangement in the context of a photoconductive device and a photo-luminescence device.

Diode Junction with LASL Layer

Figure 4:
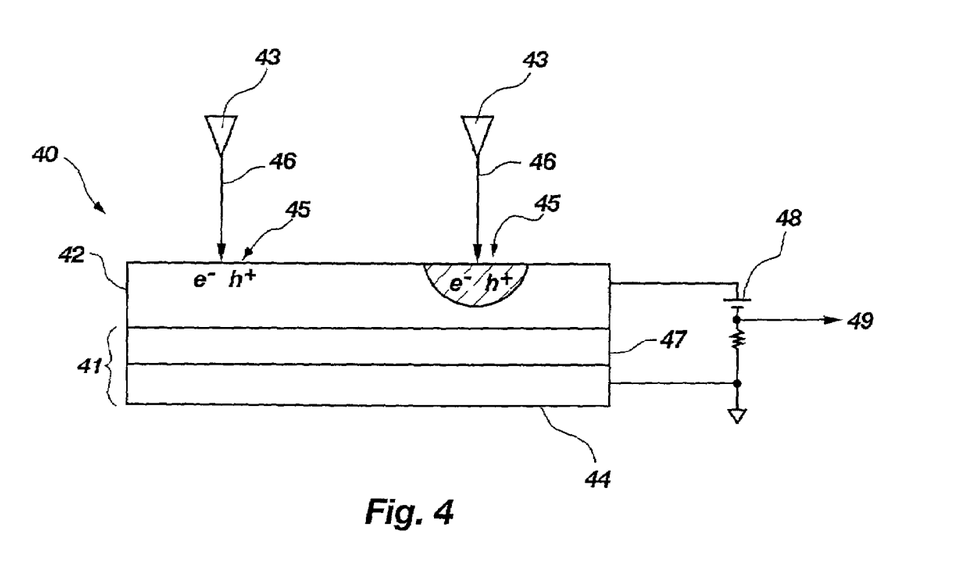
FIG. 4 is a schematic cross-section view of a data storage device utilizing a semiconductor diode junction and a LASL arrangement in accordance with a first preferred embodiment of the present invention.

Looking now at FIG. 4, the preferred embodiment of the present invention is shown. A data storage system 40 utilizes a semiconductor diode 41 for sensing the electron-hole carrier flow in response to reading the data in a selected storage area. Light emitting devices 43, such as near-field optics systems, are disposed above a data storage layer 42 that comprises one layer of the diode 41. A LASL layer 47 is disposed beneath storage layer 42 and together with layer 44 forms the diode 41.

A data bit is written by locally altering the state at areas 45 of the storage layer 42 with the use of light emitting units 43 emitting directed light beams 46 on storage areas 45 in storage layer 42. The different states of the storage areas 45 must provide a contrast in bit detection during the read function. Other sources of energy, such as a resistive heater or applied electric or magnetic field may be used to bias a large area of the storage layer 42 to aid the light beams 46 in locally affecting a change of state in the storage areas 45.

During the read function, the light emitters 43 emit a lower level energy field to locally excite charge carriers in the LASL 47 of the diode 41, as discussed with respect to FIG. 4. The amount of the beam that reaches the LASL 47 will depend on the state of the storage area 45. Thus the storage layer acts primarily as a variable absorber or reflector of the beam during the read stage, depending on the state of the storage area. An additional field may be applied across interface 47 by a voltage source 48. The current that results from carriers passing across the diode interface between layer 47 and layer 44 can be monitored by a detection signal 49 taken across the interface between layer 47 and layer 44 to determine the state of data storage areas 45. Alternatively, the open circuit photo-voltage generated across diode 41 could be monitored.

Thus, variations in the current generated across the diode 41 by the read photons depend on the local generation efficiency and the local collection efficiency of the junction/LASL structure as influenced by the LASL. Both of these factors are influenced by the state of the region upon which the photons are incident.

Photoconductive LASL

Figure 5:
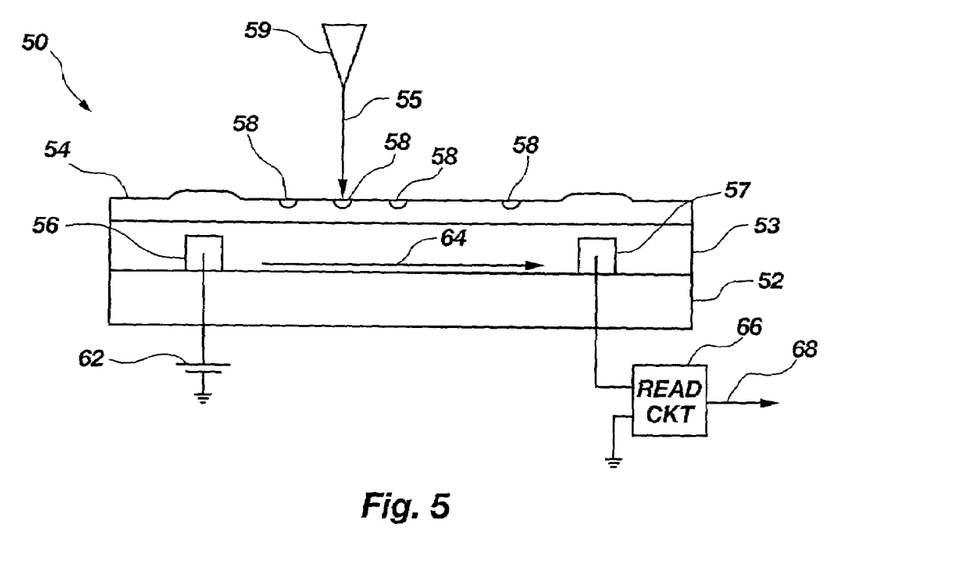
FIG. 5 is a schematic cross-section view of a data storage device utilizing a photoconductivity region and a LASL arrangement in accordance with another preferred embodiment of the present invention.

With reference to FIG. 5, another structure is depicted in which photoconductivity is utilized for the detection of recorded bits. Storage device 50 includes an electrically insulating substrate 52 and a storage layer 54. The substrate 52 may be made of silicon having an oxidized top layer. The storage layer 54 has a plurality of data storage areas 58 to be sensed by light beam 55 directed from a beam emitter 59. A photoconductive LASL layer 53 is disposed beneath the storage layer 54 for detecting the amount of light that makes it through the storage layer, which in turn is dependent on the state of the storage areas 58. The photoconductive layer 53 may include a single layer of photoconductive material or multiple layers of different photoconductive materials.

A plurality of spaced apart electrodes, such as electrode pair 56 and 57, make contact with the LASL layer 53, which may be deposited over or under electrodes 56 and 57. The data storage region containing a plurality of data storage areas 58 is located between electrodes 56 and 57, as shown in FIG. 5. The storage areas may be arranged in rows and columns, with the state of each area being determinative of the data stored therein. In one embodiment, the storage areas are of sub-micron size, approximately 10 nanometers to 30 nanometers in diameter and spaced about 50 nanometers apart.

An array of light beam emitters 59 is disposed above the storage layer 54 to provide directed beams of energy, as previously discussed. The directed beam 55 has appropriate time and power parameters to change the state of the storage areas 58 between amorphous and crystalline states or between different crystalline states, as discussed above. Micro-movers may be used to scan the array of light beam emitters over the storage areas 58.

A power supply 62 applies a bias voltage across the electrodes 56 and 57 during the read function. This bias voltage induces an electric field 64 in the plane of the photoconductive layer 53. The power supply may be fabricated on the substrate 52 or may be provided outside the chip.

During read operations on the storage areas 58, light beam emitter 59 is scanned between electrodes 56 and 57 while the bias voltage is applied to the electrodes. When the light beam 55 impacts the photoconductive layer 53, electron carriers and hole carriers are produced and accelerated by the electric field 64 towards electrodes 56 and 57. This movement of electrons and holes causes a current to flow, which is detected by a read circuit 66 to provide an output signal 68. The amount of light that makes it to the photoconductive LASL 53 is influenced by the state of the overlying storage layer 54. The change in the state of the storage layer can impact the amount of light reaching the photoconductive LASL 53 by changes in absorption and/or reflection of the read beam light.

The LASL layer 53 is preferably made of a material that is a good photoconductor. Thus the result should be an improvement in the detection of carriers by read circuit 66 and minimizing error in the output signal 68 indicating the state of the storage area interrogated by the emitter 59. In this embodiment, the LASL again enables the separation of functions to improve performance of the memory storage unit. The LASL material is selected primarily for its photoconductive response, allowing the desirable thermal, chemical and optical properties of the data storage layer to be engineered separately.

By monitoring the changes in the magnitude of the photocurrent, the states of the storage areas 58 can be determined. The output 68 from read circuit 66 may be amplified and converted from analog to a digital value if desired.

Photoluminescent LASL

Figure 6:
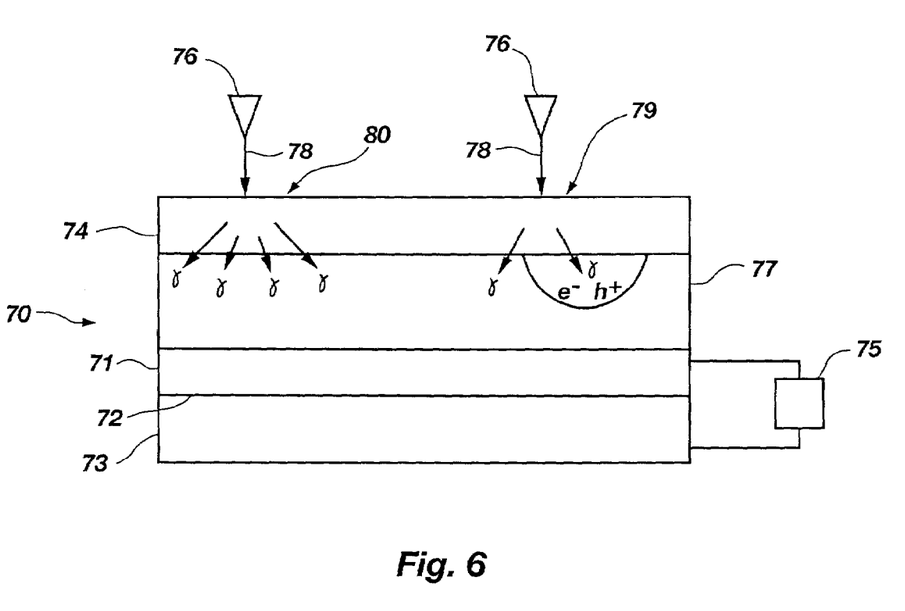
FIG. 6 is a schematic cross-section view of a data storage device utilizing a photo-luminescent structure and a LASL arrangement in accordance with another preferred embodiment of the present invention.

Referring now to FIG. 6, another storage structure is shown wherein the electron-hole pairs generated during the read process are detected via their radiative recombination. In this arrangement the LASL is a photoluminescent material that generates photons in response to read light beams. The LASL is disposed on top of the storage layer that acts as a light filter to variably absorb or reflect the light depending on the state of the storage areas. A photo-detector, such as a photodiode, photoconductor or microfabricated photomultiplier tube may be used for photon detection.

In this embodiment, the LASL 74 again enables the separation of functions to improve performance of the memory storage unit. The LASL material is selected primarily for its ability to convert light from a wavelength generated by the light beam emitters to a wavelength range for optimal use by the storage layer 77. The storage layer 77 is selected primarily for its ability to change phases in response to the emission of light from the LASL 74. Thus, one may select an inexpensive, easy to use emitter for the light beam and a phase change material that provides excellent contrast in light absorption and reflection between written and unwritten states. The LASL provides the match by receiving light at one wavelength from the emitter and generating light at another wavelength to accommodate the demands of the storage material.

As shown in FIG. 6, a photoluminescent LASL 74 is deposited on the surface of the storage unit 70. Light emitters 76 are disposed near the surface of photoluminescent LASL 74 to direct light beams 78 onto the surface. A storage layer 77 is disposed beneath LASL 74 and above a photodiode structure made up of layers 71 and 73 or some other type of photodetector.

Data is stored in the storage layer 77 by applying the light beams 78 in selected storage areas 79 to alter the light absorbing or reflecting properties of the storage layer. The storage layer material can be any one of a number of chalcogenide-based phase-change materials. The light absorbing or reflecting properties of the storage layer 77 may be altered in a number of different ways, such as by changing the electronic band structure and/or introducing defects that affect the optical properties. The LASL 74 is made of material that is sufficient to withstand high temperatures during the writing phase to the underlying storage layer 77.

During the read mode, the light beams 78 have a lower power intensity to prevent undesired writing. The written storage areas 79 will absorb and/or reflect a different number of photons than the other areas 80 on the storage layer 77 that have not been written. The photons that pass through the storage layer will generate a current of electron and hole carriers in the photodiode. A meter 75 connected between the layers of photodiode 70 measures the current or voltage across the photodiode interface 72 as each storage area is impacted by a light beam, to determine the state of each sensed storage area. It is understood that layer 71 is used here to form a layer of the photodiode, so that the LASL layer does not need to provide that function. Layer 71 may be eliminated if storage layer 77 is fabricated of suitable materials to accommodate the photodiode function.

For the "photoluminescent LASL" embodiment, further explanation is in order. It should be noted that, in all three preferred examples discussed herein, the storage layer is used as a variable absorber and/or reflector. The difference between the first two preferred embodiments described above is primarily a difference in how the light that makes it through the storage layer is detected (photodiode in the first case, photoconductor in the second case). In the photoluminescent LASL case, any sort of photodetector can be used, but the light of the read beam is converted to photoluminescent light, which is then partially absorbed or reflected by the storage layer.

There are several reasons for converting light of one wavelength or wavelength range to light of a different wavelength or wavelength range. One reason is that the wavelength range of an inexpensive, easy to produce emitter is not matched to the wavelength range in which the best phase-change materials give the best contrast in absorption and reflection between their written and unwritten states. The luminescent LASL may be used to convert the emitters' light to a wavelength range better suited to the preferred phase-change material. Another reason for wavelength conversion is to produce light at a wavelength or wavelength range that better matches the range of highest sensitivity of an inexpensive, easy to produce photodetector.

Another reason for wavelength conversion is to incorporate a luminescent LASL, or several LASL layers that luminescence at different wavelengths, to produce light at multiple wavelengths with a single, inexpensive, easy to manufacture emitter that can be used to access bits in multiple phase-change storage layers (with each storage layer matched to a different wavelength range).

Another alternative embodiment to the foregoing structure is to place the storage layer above the LASL and use the storage layer to filter the amount of light that reaches the luminescent LASL. Detection of photons emitted from the LASL would be accomplished by an appropriate photodetector.

LASL Method

Figure 7:
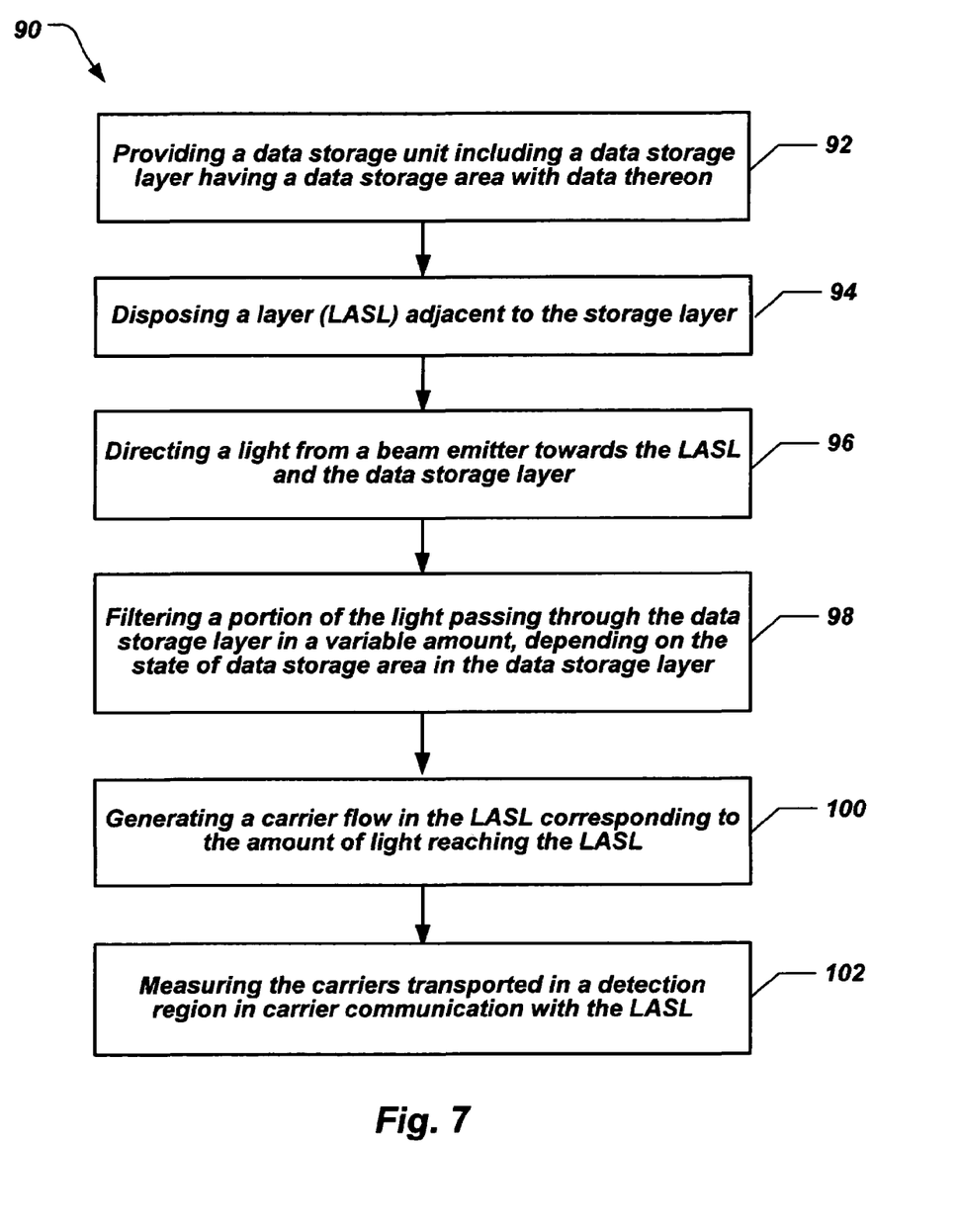
FIG. 7 is a flow diagram illustrating one preferred method of the present invention.

Referring now to FIG. 7, a preferred embodiment of a method 90 of the present invention is shown. At step 92, a data storage unit is provided including a data storage layer having a data storage area with data thereon. Next at step 94 a layer (LASL) adjacent to the storage layer is preferably disposed adjacent to the data storage area. At step 96, a light beam is directed from a light beam emitter toward the LASL and the data storage layer. Next at 98, a portion of the light beam is filtered as the light passes through the data storage area, the filtering being in a variable amount depending on the state of the data storage area, thereby reading said data from the data storage area. At step 100, carrier flow is generated in the LASL corresponding to the amount of light reaching the LASL. Finally at step 102, this carrier transport is detected in a detection region that is in carrier communication with the LASL.

Preferably, the energy deposited in the adjacent layer may comprise charge carriers generated in response to the beams impinging on the adjacent layer. Alternatively, the energy deposited in the adjacent layer may comprise photons generated in response to the beams impinging on the adjacent layer.

The LASL layer may be closer to the beams than the storage layer. In such case, the LASL layer is likely to be substantially transparent to the light beams when it is used as a protective layer. In the photoluminescent case, the LASL is preferably not transparent, but is used to convert light from one wavelength to another. In the diode and photoconductor cases, the adjacent layer may also act as a state-sensitive variable absorber or reflector or affect the recombination rate of the electron-hole pairs generated by the read beam. Carrier flow in the LASL may be affected in response to changes in the applied or built-in electric field due to the proximity of a written region in the storage layer.

Other Layers

Since light beams may be used, it is possible and may be advantageous to cover the storage layer or the adjacent layer with transparent electrodes. For example, uniform top and bottom electrodes will enhance the uniformity of the biasing field formed across diode components of this invention. A back electrode could be present, either on the side of the substrate opposite the optical sources, if a conducting substrate is used, or on top of the substrate, if an electrically isolated substrate is used that provides mechanical support only. Using an optical beam, a transparent top electrode can be used that covers the entire top surface of the device.

The storage layer may also be covered with a protective layer to prevent chemical changes, such as oxidation or thermo-mechanical changes such as bump or pit formation, during the write mode. The adjacent layer could form a protective layer, as long as it is thin enough to allow writing of small bits. The protective layer may be merely a passivation layer or a conducting transparent electrode that is used to collect the photo-generated carriers in the diode case.

The storage layer may also be covered with a layer that enhances thermal properties of the overall storage medium. For example, if the storage layer is a phase-change material, it may be desirable for it to be in contact with a layer that aids in thermal quenching by acting as a heat sink when changing the state of the materials to an amorphous state. Alternately, or in conjunction with a cover layer, it may be desirable to have a layer underneath the storage layer or adjacent layer that improves thermal properties, such as the ability to quench and amorphize the storage layer. A protective underlayer may also enhance the robustness of the device by preventing interdiffusion between the storage layer and the substrate material, or by discouraging delamination or dewetting of the storage layer from the substrate.

A layer covering the storage layer, or LASL, may also be used to enhance optical properties, such as an anti-reflection coating. Such a coating could be used to increase the amount of light from the light source that is absorbed in the storage layer or the adjacent layer. Alternately, or in conjunction with a cover layer, a layer underneath the storage layer, or LASL, could be used to enhance its optical properties or reflect some of the transmitted light back into the storage layer or LASL.

A buffer layer underlying the storage layer may also be used to control the growth mode and improve the film morphology of the storage layer and/or the LASL. The LASL itself may serve as a buffer layer. For example, the buffer layer may force the layers above it to form in a particular crystalline phase or orientation. Control of the crystalline phase and orientation may be important in achieving the desired electrical, optical or thermal properties of the LASL or data storage layer.

Although one layer is shown adjacent the storage layer, it is understood that multiple LASLs may be utilized within the scope of the present invention. Moreover, although the LASL is described as being adjacent to the storage layer, it is understood that such layer may be separated from the storage layer by some other layer, such as those described above, and still be considered to be adjacent to the storage layer within the scope of the present invention.

In other variations of the present invention the LASL may function as one or more of the following: (1) a protective cover for the data storage layer, (2) a diffusion barrier for the data storage layer, (3) a thermal layer for the data storage layer, and/or (4) a growth facilitator of the data storage layer on the LASL.

Although the above embodiments are representative of the present invention, other embodiments will be apparent to those skilled in the art from a consideration of this specification and the appended claims, or from a practice of the embodiments of the disclosed invention. It is intended that the specification and embodiments therein be considered as exemplary only, with the present invention being defined by the claims and their equivalents.

What is claimed is:

1. A data storage unit, comprising:
a data storage layer having a data storage area with data stored thereon;
a light beam emitter for selectively directing a beam of light toward the data storage layer to read said data from the data storage area;
the storage layer being partially transparent to the beam of light and the storage area filtering the amount of light passing through the storage layer;
a layer (LASL) adjacent to the data storage layer in which carriers are generated in response to the amount of light from the light beam emitter reaching the LASL; and
a detection region in carrier communication with the LASL for measuring the carrier transport in the detection region to determine the state of the storage area.

2. The data storage unit as recited in claim 1, wherein the storage layer is closer to the light beam emitters than the LASL.

3. The data storage unit as recited in claim 1, wherein the storage layer acts as a variable light absorber depending on the state of the storage layer.

4. The data storage unit as recited in claim 1, wherein the storage layer acts as a variable reflector depending on the state of the storage layer.

5. The data storage unit as recited in claim 2, further comprising another photodiode layer beneath the LASL, wherein the LASL forms a photodiode with the photodiode layer and the detection region is the junction between the LASL and the photodiode layer.

6. The data storage unit as recited in claim 5 wherein a photovoltage or photocurrent detector is connected across the photodiode junction.

7. The data storage unit as recited in claim 2, wherein the LASL is a photoconductor having first and second electrodes therein and the detection region is the area between the first and second electrodes.

8. The data storage unit as recited in claim 7 wherein a current detector is connected between the first and second electrodes.

9. The data storage unit as recited in claim 1 wherein the LASL is a photoluminescent layer and the detection region is a photon detector in light communication with the LASL.

10. The data storage unit as recited in claim 9, wherein the storage layer is a variable filter of the light reaching the LASL, the amount of the light being filtered being dependent on the state of the storage area.

11. The data storage unit as recited in claim 9, wherein the LASL is a converter of the wavelength of the light from the beam emitters to a wavelength that is conducive to detection in the detection region.

12. The data storage unit as recited in claim 9, wherein the LASL is closer than the storage layer to the light beam emitters.

13. The data storage unit as recited in claim 9, wherein the LASL is a converter of the wavelength of the light from the beam emitters to a wavelength that is conducive for the storage layer to provide contrast in the amount of transmitted light dependent upon the state of the storage area.

14. The data storage unit as recited in claim 9, wherein the storage layer is closer than the LASL to the light beam emitters.

15. A method for reading data in a data storage unit including a data storage layer having a data storage area with data thereon, comprising:
disposing a layer (LASL) adjacent to the storage layer;
directing a light beam from a light beam emitter towards the LASL and the data storage layer;
filtering a portion of the light passing through the data storage layer in a variable amount, depending on the state of the data storage area in the data storage layer;
generating a carrier flow in the LASL corresponding to the amount of light reaching the LASL from the light beam emitter; and
measuring the carrier transport in a detection region in carrier communication with the LASL.

16. The method recited in claim 15 wherein the storage layer affects the carrier flow generated in the LASL by filtering the amount of light that reaches the LASL from the read optical beams, the degree of filtering being representative of the state of the storage area.

17. The method recited in claim 15, wherein the storage layer is nearer than the LASL to the beam emitter.

18. The method recited in claim 17, wherein the LASL forms a photodiode with a photodiode layer and the detection region is the junction between the LASL and the photodiode layer.

19. The method recited in claim 17, wherein the LASL is a photoconductor having first and second electrodes therein and the detection region is the area between the first and second electrodes.

20. The data storage unit as recited in claim 15 wherein the LASL is a photoluminescent layer and the detection region is a photon detector in light communication with the LASL.

21. A data storage unit, having a data storage layer with a data storage area having at least two states for storing data stored thereon in response to a light beam from a light beam emitter, comprising a layer (LASL) adjacent to the data storage layer in which carriers are generated for determining the state of the storage area, wherein carriers are generated in the LASL in response to the amount of light from the light beam emitter that reaches the LASL.

22. The data storage unit as recited in claim 21, wherein the data storage layer is a variable light filter for the light from the light beam, the amount of filtered light depending on the state of the data storage area.

23. The data storage unit as recited in claim 21, wherein the LASL provides a protective cover for the data storage layer.

24. The data storage unit as recited in claim 21, wherein the LASL provides a diffusion barrier for the data storage layer.

25. The data storage unit as recited in claim 21, wherein the LASL provides a thermal layer for the data storage layer.

26. The data storage unit as recited in claim 21, wherein the LASL facilitates the growth of the data storage layer on the LASL.

* * * * *